United States Patent
Kwak et al.

(10) Patent No.: US 10,296,566 B2
(45) Date of Patent: May 21, 2019

(54) APPARATUS AND METHOD FOR OUTPUTTING WEB CONTENT THAT IS RENDERED BASED ON DEVICE INFORMATION

(71) Applicant: SK PLANET CO., LTD., Seongnam-si, Gyeonggi-do (KR)

(72) Inventors: Nohyun Kwak, Goyang-si (KR); SangSeok Lim, Yongin-si (KR)

(73) Assignee: SK PLANET CO., LTD., Seongnam-si (KR)

( * ) Notice: Subject to any disclaimer, the term of this patent is extended or adjusted under 35 U.S.C. 154(b) by 3 days.

(21) Appl. No.: 15/540,073

(22) PCT Filed: Jan. 4, 2016

(86) PCT No.: PCT/KR2016/000014
§ 371 (c)(1),
(2) Date: Jun. 27, 2017

(87) PCT Pub. No.: WO2016/108677
PCT Pub. Date: Jul. 7, 2016

(65) Prior Publication Data
US 2018/0011822 A1 Jan. 11, 2018

(30) Foreign Application Priority Data
Jan. 2, 2015 (KR) .................. 10-2015-0000240

(51) Int. Cl.
*G06F 17/21* (2006.01)
*G06F 17/22* (2006.01)
(Continued)

(52) U.S. Cl.
CPC ...... *G06F 17/2247* (2013.01); *G06F 16/9574* (2019.01); *G06F 17/212* (2013.01); *A63F 13/335* (2014.09)

(58) Field of Classification Search
None
See application file for complete search history.

(56) References Cited

U.S. PATENT DOCUMENTS 6,672,963 B1 * 1/2004 Link ................ A63F 13/10
463/43
7,804,501 B2 * 9/2010 Stacy ................ A63F 13/12
345/428

(Continued)

FOREIGN PATENT DOCUMENTS

| JP | 2011-215687 A | 10/2011 |
| KR | 10-2012-0099328 A | 9/2012 |
| WO | 2008-132706 A1 | 11/2008 |

OTHER PUBLICATIONS

Kevin Moot and Ryan DeLuca; Complement canvas with HTML markup, Part 1: Blend the canvas API and HTML/CSS model; https://www.ibm.com/developerworks/library/wa-htmlmark/index.html (Aug. 7, 2012).*

(Continued)

*Primary Examiner* — Asher D Kells
(74) *Attorney, Agent, or Firm* — Brinks Gilson & Lione

(57) ABSTRACT

Disclosed are an apparatus and a method for outputting web content. The apparatus and method can prevent rendering performance from being degraded in some operating systems when web content (web document) is output through a web browser.

14 Claims, 4 Drawing Sheets

(51) Int. Cl.
    *A63F 13/335*    (2014.01)
    *G06F 16/957*    (2019.01)

(56)            References Cited

U.S. PATENT DOCUMENTS

| 9,897,805 B2* | 2/2018 | Stafford | G02B 27/0093 |
| 9,959,256 B1* | 5/2018 | Alagappan | G06F 17/2247 |
| 2004/0012627 A1* | 1/2004 | Zakharia | G06F 17/30905 |
| | | | 715/744 |
| 2008/0117926 A1* | 5/2008 | Bassali | H04L 47/10 |
| | | | 370/412 |
| 2013/0097477 A1 | 4/2013 | Adolf et al. | |

OTHER PUBLICATIONS

Lopez, Sergio et al., "Using the DOM Tree for Content Extraction", Workshop on Automated Specification and Verification of Web Systems, Jun. 16, 2012, pp. 1-12.
International Search Report for PCT/KR2016/000014 dated Mar. 31, 2016, citing the above reference(s).

\* cited by examiner

FIG. 3

APPARATUS AND METHOD FOR OUTPUTTING WEB CONTENT THAT IS RENDERED BASED ON DEVICE INFORMATION

CROSS REFERENCE TO RELATED APPLICATION

This present application is a national stage filing under 35 U.S.C § 371 of PCT application number PCT/KR2016/000014 filed on Jan. 4, 2016 which is based upon and claims the benefit of priority to Korean Patent Application Nos. 10-2015-0000240 filed on Jan. 2, 2015 in the Korean Intellectual Property Office. The disclosures of the above-listed applications are hereby incorporated by reference herein in their entirety.

BACKGROUND OF THE DISCLOSURE

1. Field of the Disclosure

The present disclosure relates to technology for optimizing the output of web content in view of the performance of an apparatus, such as a version of an operating system and the like in outputting web content through a web browser.

2. Description of the Prior Art

With the progress of the Internet and mobile technology, various types of content are provided to users.

Pieces of content, which can be output from a mobile device such as a smart phone and a tablet Personal Computer (PC), may be implemented by an application produced for each mobile device platform, or implemented by a web browser.

In two types of implementation, a case where content is implemented by a web browser (web content) is advantageous in that a mobile device including a compatible web browser can output content regardless of what kind of mobile device operating system or mobile device platform the mobile device has and there is no the need to produce separate content for each mobile device operating system or mobile device platform.

Such pieces of web content are made in the form of a HyperText Markup Language (HTML) document, and recently, are made in HTML5 which is a new standard.

Currently, most browsers support an element and an Application Programming Interface (API) of HTML5, HTML5, which is supported by most browsers as described above, is advantageous as compared with previous versions in that HTML5 can provide complete support for Cascading Style Sheets 3 (CSS 3), enables the output of video/audio in a browser without a separate application program, and can support a web application.

Meanwhile, when web content (e.g., a web game) written in HTML5 is output by a mobile device, cases may occur in which the performance of the output of web content by a particular mobile device is degraded.

As a representative case from among the cases, a phenomenon is found in which rendering performance is rapidly degraded, for example, a speed is reduced, in a mobile device running on KitKat (i.e., Android 4.4) when an area is large in which a web document is to be rendered on an HTML5 canvas. Particularly, in the case of the mobile device, a phenomenon occurs in which, although the performance of hardware of the mobile device is good, the rendering performance is degraded for a reason which is not clearly defined.

In the case of a web game, it is essential to synchronize input and output timings, and thus, it is necessary to overcome the phenomenon in which the rendering performance is degraded in a mobile device running on, for example, KitKat in order to allow the web game to be executed in various execution environments, meaningful.

SUMMARY OF THE DISCLOSURE

An objective, which is desired to be achieved in the present disclosure, is to provide an apparatus and a method for outputting web content which, in outputting web content (web document) through a web browser, can optimize the output of web content in view of the performance of the apparatus such as a version of an operating system and the like.

In accordance with an aspect of the present disclosure, a web content output apparatus is provided. The web content output apparatus includes: a device analyzer configured to identify device information; an entity extractor configured to extract respective entities in a web document, and to classify the extracted entities into at least one sub-entity having a low importance level and a main entity obtained by excluding the sub-entity from the web document; and a rendering engine configured to render the web document and to output the rendered web document, wherein the rendering engine is configured to render an area including the main entity when the identified device information corresponds to any predetermined one piece of device information.

Preferably, the rendering engine may be configured to delete the sub-entity and to render only the area including the main entity.

Preferably, the rendering engine may be configured to reduce a resolution of an area including the sub-entity.

Preferably, the rendering engine may be configured to render the area including the main entity and an area including the sub-entity in different rendering schemes and then output grespective pieces of content generated by the different rendering schemes in such a manner as to overlay the respective pieces of content.

Preferably, the web document may correspond to a web document generated according to Hypertext Markup Language 5 (Html 5), and the rendering engine may be configured to render the area including the main entity on a canvas; and to render the area including the sub-entity by using Cascading Style Sheets (CSS).

Preferably, the sub-entity may be defined as a Document Object Model (DOM) node in the web document.

Preferably, the device information may include operating system information and version information which are used by the web content output apparatus.

In accordance with another aspect of the present disclosure, a web content output method is provided. The web content output method includes: identifying device information; extracting respective entities in a web document, and classifying the extracted entities into at least one sub-entity having a low importance level and a main entity obtained by excluding the sub-entity from the web document; and rendering the web document and outputting the rendered web document, wherein the rendering of the web document and the outputting of the rendered web document include rendering an area including the main entity when the identified device information corresponds to any predetermined one piece of device information.

Preferably, the rendering of the web document and the outputting of the rendered web document may include deleting the sub-entity and rendering the area including the main entity.

Preferably, the rendering of the web document and the outputting of the rendered web document may include reducing a resolution of an area including the sub-entity.

Preferably, the rendering of the web document and the outputting of the rendered web document may include: rendering an area including the main entity and an area including the sub-entity in different rendering schemes; and outputting respective pieces of content generated by the different rendering schemes in such a manner as to overlay the respective pieces of content.

Preferably, the web document may correspond to a web document generated according to Hypertext Markup Language 5 (Html 5), and the rendering of the web document and the outputting of the rendered web document may include rendering the area including the main entity on a canvas, and rendering the area including the sub-entity by using Cascading Style Sheets (CSS).

Preferably, the sub-entity may be defined as a Document Object Model (DOM) node in the web document.

Preferably, the device information may include operating system information and version information which are used by the web content output apparatus.

The apparatus and the method for outputting web content according to an embodiment of the present disclosure can optimize the output of web content in view of the performance of the apparatus, such as a version of an operating system and the like, in outputting web content (web document) through a web browser, and thereby can achieve the effect of preventing the degradation of rendering performance in some operating systems.

BRIEF DESCRIPTION OF THE DRAWINGS

FIG. 3 is a view illustrating an example of an html document written according to an embodiment of the present disclosure.

DETAILED DESCRIPTION OF THE PREFERRED EMBODIMENTS

Figure 1:
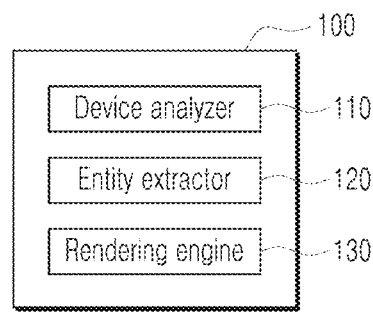
FIG. 1 is a block diagram illustrating a configuration of a web content output apparatus according to an embodiment of the present disclosure.

It should be noted that the technical terms used in this specification are merely used to describe a particular embodiment and are not intended to limit the technical idea disclosed in this specification. Also, the technical terms used in this specification should be construed as having a general meaning understandable by those having ordinary knowledge in the technical field, to which the art disclosed in this specification pertains, unless especially defined as a different meaning in this specification, and should not be construed as having an excessively inclusive meaning or an excessively reduced meaning. Also, when a technical term used in this specification is an incorrect technical term failing to exactly express the technical idea disclosed in this specification, the technical term should be replaced by a technical term which can be correctly understood by those skilled in the art. Further, the general terms used in this specification should be construed as the definition in a dictionary or in accordance with the context, and should not be construed as having an excessively reduced meaning.

Further, a singular expression used in this specification includes a plural expression unless the context clearly indicates otherwise. In this specification, the term "configure", "comprise", or the like should not be construed as necessarily including all of several elements or steps described herein, and accordingly, should be construed as not including some of the several elements or steps, or should be construed as further including additional component(s) or step(s).

Further, although terms including ordinal numbers such as "first", "second", and the like used in this specification may be used to describe various elements, the elements should not be limited by the terms. The terms are only used to distinguish one element from another. For example, a first element may be termed a second element, and similarly, a second element may be termed a first element without departing from the scope of the present disclosure.

Hereinafter, embodiments disclosed in this specification will be described in detail with reference to the accompanying drawings, and identical or similar elements are assigned identical reference numerals regardless of the drawing numbers and a repeated description thereof will be omitted.

Further, in describing the art disclosed in this specification, a detailed description of the known related art incorporated herein will be omitted when it may make the subject matter of the art disclosed in this specification rather unclear. Further, it should be noted that the accompanying drawings are just provided to facilitate the understanding of the technical idea disclosed in this specification and should not be construed as limiting the technical idea.

FIG. 1 is a block diagram illustrating a configuration of a web content output apparatus 100 according to an embodiment of the present disclosure.

As illustrated in FIG. 1, the web content output apparatus 100 includes a device analyzer 110, an entity extractor 120, and a rendering engine 130, and there is no difficulty in implementing the idea of the present disclosure although some of the illustrated elements are omitted or replaced.

The web content output apparatus 100 may have software and hardware that run/operate on an operating system, and may be implemented by a known it apparatus including a web browser that reads and outputs web content (web document) received from an external server through the Internet.

For example, the web content output apparatus 100 may be implemented by a portable mobile device, such as a smart phone, a tablet PC, a Personal Digital Assistant (PDA), and the like, or may be implemented by a desktop PC, a laptop PC, or the like.

Also, the mobile device may use Android, iOS, Symbian, Tizen, and the like as an operating system, may have no restriction on using a known web browser (e.g., Internet Explorer, Chrome, Opera, Firefox, etc.) as a web browser, and a specific implementation example thereof is not limited to the above-described examples.

In this specification, the web content output apparatus 100 may be defined as the mobile device itself, or may be defined by functions performed by a web browser installed on the mobile device.

That is, the present disclosure relates to a rendering technique in the case of outputting a web document from an external server, and main techniques of the present disclosure may be performed by the web browser.

The device analyzer 110 is configured to identify device information. Here, the device information may include operating system information and version information which are used by the web content output apparatus 100.

The device analyzer 110 may be configured to identify information related to a device by using the operating system, and to identify the device information prior to or simultaneously with a process of receiving and reading a web document.

The web document received by the web content output apparatus 100 may include a JavaScript code for identifying device information, and the device analyzer 110 may be configured to identify the device information by using the operating system through the execution of the code.

The configuration below is an example of a code for identifying whether the operating system and the version information of the web content output apparatus 100 correspond to any preset one piece of device information (KitKat).

var ua=window.navigator.userAgent,
kitkat=(/Android 4.4;/i).test(ua);

Also, the device information may include various pieces of information related to the web content output apparatus 100, such as a model name, the type of a used Application Processor (AP), a display resolution, and the like.

When a user accesses the Internet and inputs a particular domain, the web content output apparatus 100 is configured to transmit a HyperText Transfer Protocol (HTTP) request message to an Internet Protocol (IP) of the relevant domain, and to receive a web document from a relevant server.

In the present disclosure, the web document may be a document written in HTML5. HTML5, which is the latest standard of an HTML which is a standard for writing a web document, may implement the same functions as Active X without installing the same, and particularly, may create colorful graphic effects in a web browser without Flash, Silverlight, or JAVA FX.

Currently, most browsers support an element and an API of HTML5. HTML5 is advantageous as compared with previous versions in that HTML5 can provide complete support for Cascading Style Sheets 3 (CSS 3), enables the output of video/audio in a browser without a separate application program, and can support a web application.

In the present disclosure, a web document for implementing web game content executed through a web browser will be described as an example.

The entity extractor 120 is configured to extract respective entities from a web document received through the Internet.

Figure 2:
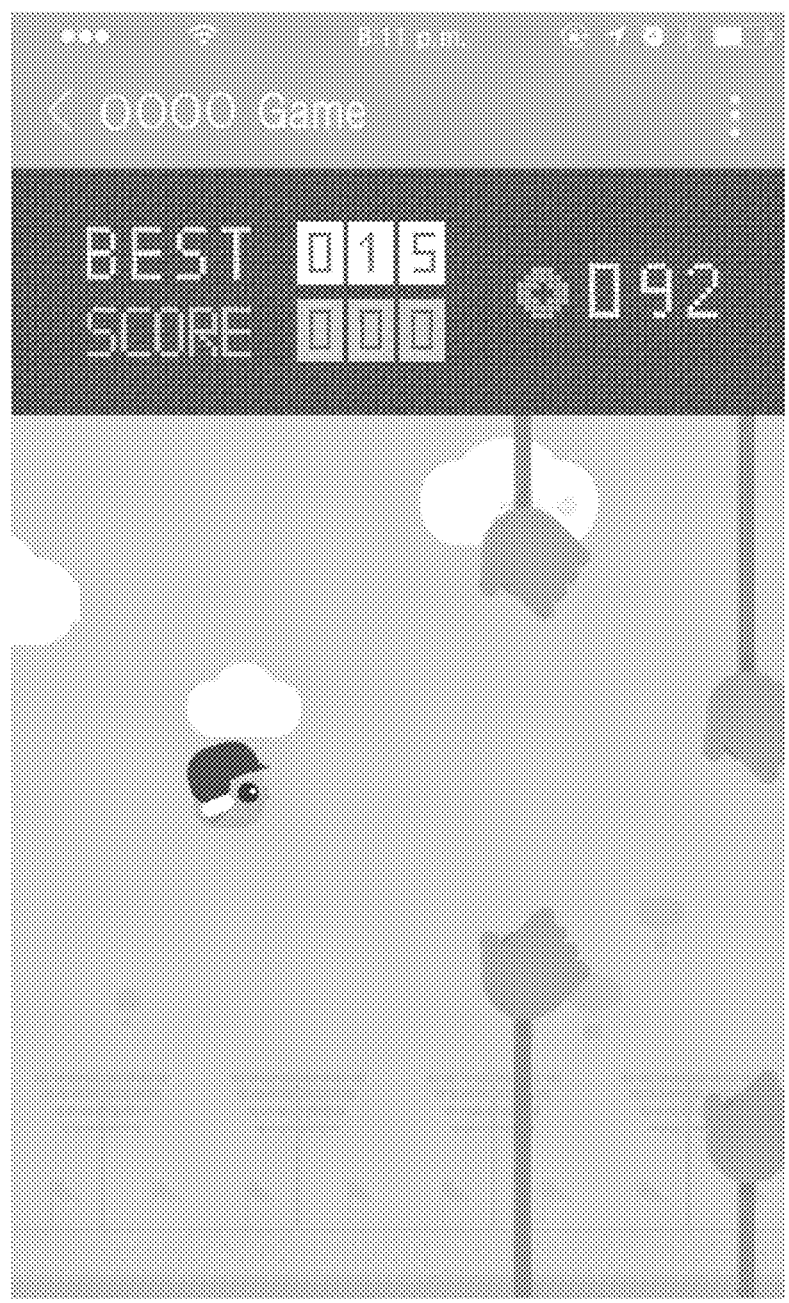
FIG. 2 is a view illustrating an example of web content.

Web documents may be implemented by at least one entity. Referring to FIG. 2 illustrating the implementation of a web game, a user character, a cloud, a tree, and the like may be defined as respective entities. The respective entities may be independently generated and moved, and may be independently defined within a web document.

Also, while the game progresses, some of the respective entities may correspond to essential entities, and some thereof may correspond to entities having a low importance level. That is, in FIG. 2, the user character or the tree may be essential in terms of the progress of the game or graphics, but the cloud may have a low importance level.

According to an embodiment of the present disclosure, the web document may include information on an entity having a low importance level among the respective entities, as described above. Hereinafter, entities having a low importance level will be defined as sub-entities, and the remaining entities except for the sub-entities will be defined as main entities.

The rendering engine 130 is configured to render a web document and to output the rendered web document.

Rendering refers to a process of applying a change in shadow, concentration, and the like to an object, which looks flat, and causing the object to have a three-dimensional effect, and is the art known in the field of computer graphics. Accordingly, a description thereof will be omitted.

Meanwhile, when web content (e.g., a web game) written by using an HTML5 canvas element is output from a mobile device, cases may occur in which the performance of the output of web content by a particular mobile device is degraded. As a representative case from among the cases, a phenomenon is found in which rendering performance is rapidly degraded, for example, a speed is reduced, in a mobile device running on KitKat (i.e., Android 4.4) when an area is large in which a web document is to be rendered on an HTML5 canvas. Particularly, in the case of the mobile device, a phenomenon occurs in which, although the performance of hardware of the mobile device is good, the rendering performance is degraded for a reason which is not clearly defined.

In the present disclosure, in order to solve the above-described problem, the web content output apparatus 100 attempts to reduce an area rendered on an HTML5 canvas.

A canvas, which is an element of HTML5, corresponds to a container for inserting an image, and the inside of the canvas may be implemented by using a JavaScript code. A web document may include an image generated according to the canvas, and the image may be rendered on the canvas in a typical case.

When the device information (i.e., operating system information and operating system version information) identified by the device analyzer 110 corresponds to any predetermined one piece of device information (e.g., KitKat (Android 4.4), etc.), the rendering engine 130 is configured to render an area including a main entity. For example, in FIG. 2, an area, which is obtained by excluding a cloud item corresponding to a sub-entity, may be rendered on the canvas.

In a method for processing a sub-entity, separate embodiments may be implemented, and rendering may be performed in such a manner as to delete a sub-entity, in such a manner as to reduce a resolution, or in a scheme separate from a scheme in the case of a main entity. Hereinafter, the respective embodiments will be described in more detail.

First Embodiment

First, the rendering engine 130 may be configured to delete the extracted sub-entity, and to render only an area including a main entity. More specifically, when the rendering engine 130 defines a resource in each configuration unit of a web game, the rendering engine 130 may be configured to declare a condition for causing an element in a web document, which corresponds to a sub-entity, to disappear.

The configuration below corresponds to an example of a code which declares the condition for causing a sub-entity to disappear as described above.

```
"cloud_syrup" : {
    image : "objectImg",
    x : 24,
    y : 432,
    width : 258,
    height : 165,
    frames : 1,
```

-continued

```
disappear : false
},
"cloud_ocb" : {
...
disappear : false
},
"cloud_tmap" : {
...
disappear : true
},
```

Accordingly, the cloud item which is a sub-entity is deleted in FIG. 2, and thus, the effect of reducing the area rendered on the canvas is achieved.

Second Embodiment

As another embodiment, the rendering engine 130 may be configured to reduce a resolution of an area including a sub-entity in a web document. A sprite resource may be used when a web game is developed, and items having various sizes may be provided in order to implement various resolutions in the web content output apparatus 100.

In order to improve rendering performance, in the case of an item having a low importance level, the rendering engine 130 may be configured to designate and output a resolution, which is lower than a determined resolution, although a resolution supported by the web content output apparatus 100 is high. Accordingly, a resolution of a main entity may be maintained as it is, and that of only an area of a sub-entity may be reduced.

The configuration below is an example of a code for performing rendering in such a manner as to reduce the resolution of a sub-entity.

```
{
"cloud_syrup" : {
image : "objectImg",
x : 24,
y : 432,
width : 258,
height : 165,
frames : 1,
disappear : false,
resolution : "low"
}
```

Third Embodiment

As another example, the rendering engine 130 may be configured to overlay respective pieces of content generated after rendering an area including a main entity and an area including a sub-entity in different rendering schemes.

In the above-described first and second embodiments, use is made of the method for deleting a sub-entity having a low importance level and the method for reducing a resolution of a sub-entity having a low importance level. However, although the sub-entity has a low importance level, when the sub-entity needs to be identically displayed in the game, it may not be desirable to delete the sub-entity or to reduce the resolution thereof.

Therefore, in the present embodiment, a method is proposed in which, while an area rendered on a canvas is reduced, a sub-entity is not deleted or a resolution is not reduced.

To this end, the rendering engine 130 may be configured to render an area including a main entity on a canvas and to render an area including a sub-entity by using CSS, in which the sub-entity may be defined as a Document Object Model (DOM) node in a web document.

A DOM is an API that defines a method for accessing all elements of an HTML document, and a DOM object represents each document element, such as text, an image, a hyperlink, a form element, and the like. A JavaScript code allows a DOM object to be accessed and manipulated in order to generate a dynamic HTML.

Sub-entities may be distinguished from each other as separate DOM nodes in a scheme, such as a <div> tag and the like. When the rendering engine 130 renders an entity formed to be a separate DOM node as described above, the rendering engine 130 is configured to change the position of the entity to the CSS and to move the entity to the CSS.

The CSS is configured to determine the style of a web document, that is, sizes, fonts, colors, and the like of respective elements included in the web document. The rendering engine 130 may be configured to complete the rendering of a sub-entity, which is defined as a DOM node, through a painting process after forming a layout by combining a CSS style structure with the sub-entity.

Also, the rendering engine 130 is configured to render an area of a main entity, which is obtained by excluding a sub-entity, on the canvas in a conventional manner. Then, the rendering engine 130 may be configured to output completed web content by overlaying pieces of content generated according to separate rendering schemes.

According to the present embodiment of the present disclosure, web content as in the case of rendering an entire area of a sub-entity may be output with respect to a reduced area of the sub-entity while an area rendered on the canvas is reduced.

Figure 3:
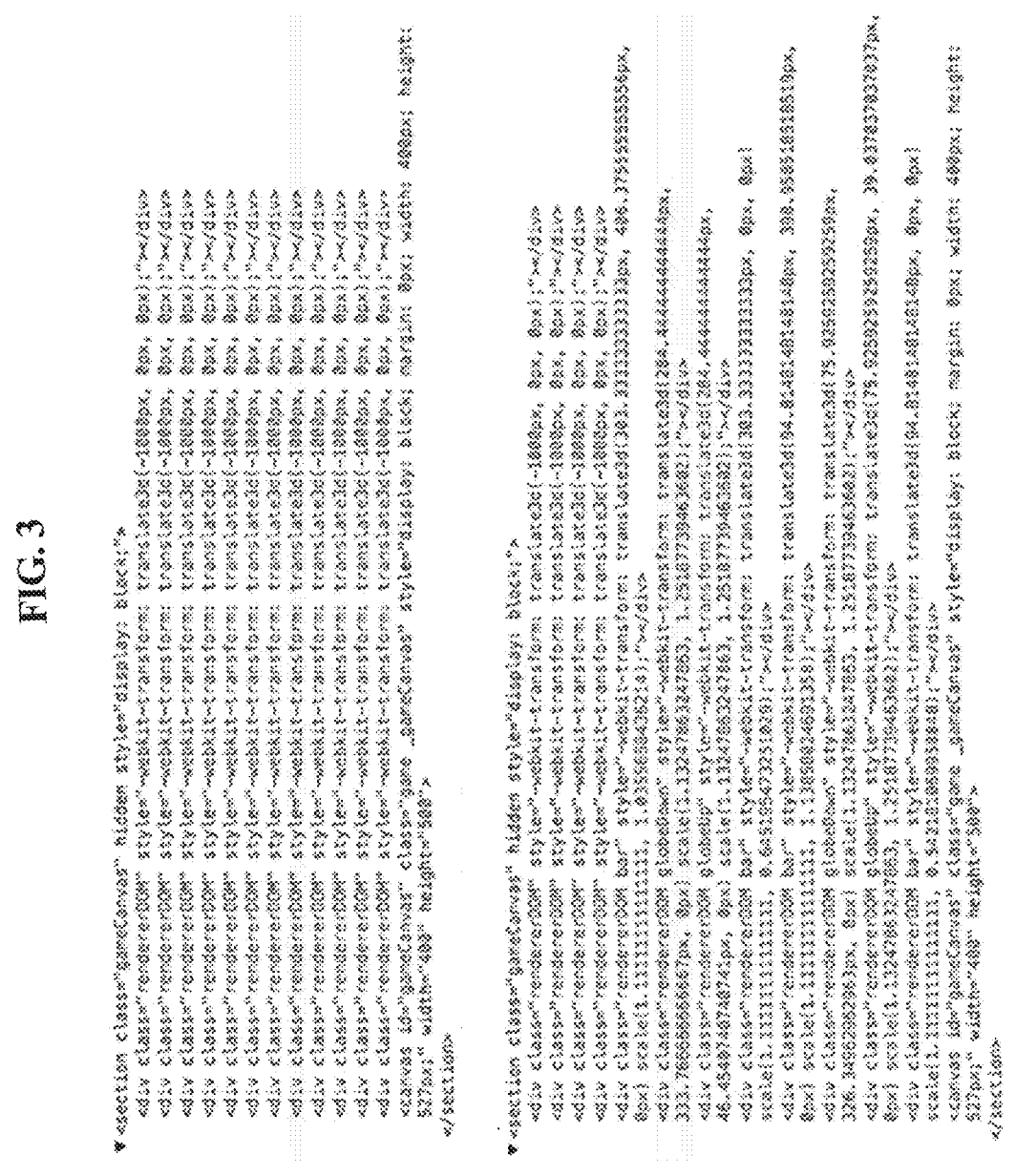

FIG. 3 is a view illustrating an example of a code for defining a sub-entity as a DOM node and rendering the sub-entity defined as a DOM node on CSS, as in the third embodiment.

According to the above-described present disclosure, when a web document is output through a web browser, the effect of preventing rendering performance from being reduced in some operating systems by reducing a rendering area of an HTML canvas can be achieved.

Figure 4:
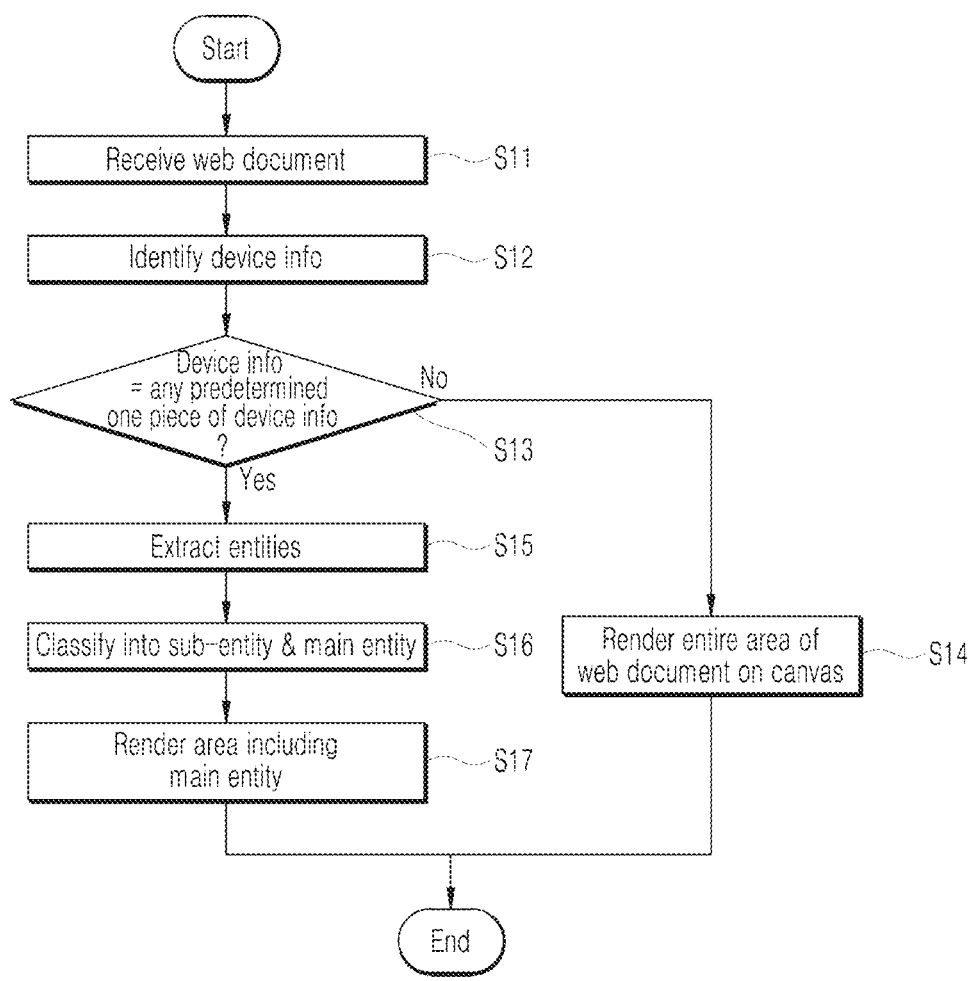
FIG. 4 is a flowchart illustrating a web content output method according to an embodiment of the present disclosure.

FIG. 4 is a flowchart illustrating a web content output method according to an embodiment of the present disclosure.

The method illustrated in FIG. 4 may be performed by the web content output apparatus described with reference to FIGS. 1 to 3, and more specifically, main functions of the illustrated method may be performed by using a web browser installed on the web content output apparatus. Hereinafter, a description of matters identical to the above-described technical features will be omitted.

When a web document is received through the Internet in step S11, the web content output apparatus identifies device information in step S12. Here, the device information may include operating system information and version information which are used by the web content output apparatus.

The web document received by the web content output apparatus may include a JavaScript code for identifying device information, and the device analyzer may identify the device information by using the operating system through the execution of the code.

When the device information does not correspond to any predetermined one piece of device information as a result of the identification in step S13, the web content output apparatus renders an entire area of the web document on a canvas in step S14 as in a typical case.

When the device information corresponds to any predetermined one piece of device information in step S13, for example, when the operating system information of the device and the version information of the operating system correspond to any predetermined one piece of device information (e.g., KitKat), the web content output apparatus performs a process for reducing a rendering area.

First, the web content output apparatus extracts respective entities from the received web document in step S15. Also, the web content output apparatus classifies the respective extracted entities into a sub-entity and a main entity in step S16.

Web documents may be implemented by at least one entity, and as described above, entities defined as having a low importance level may be defined as sub-entities, and the remaining entities except for the sub-entities may be defined as main entities.

Then, the web content output apparatus renders an area including the main entity in step S17, and schemes for rendering the entire document may be implemented as the three embodiments described below.

As the first embodiment, the web content output apparatus may delete the extracted sub-entity, and may render only an area including a main entity. More specifically, when the web content output apparatus defines a resource in each configuration unit of a web game, the web content output apparatus may declare a condition for causing an element in a web document, which corresponds to a sub-entity, to disappear.

As the second embodiment, the web content output apparatus may reduce a resolution of an area including a sub-entity in a web document. More specifically, in order to improve rendering performance, in the case of an item having a low importance level, the web content output apparatus may designate a resolution, which is lower than a determined resolution, and may output the item at the designated resolution, although a resolution supported by the web content output apparatus is high. Accordingly, a resolution of a main entity is maintained as it is, and that of only an area of a sub-entity is reduced.

As the third embodiment, the web content output apparatus may overlay respective pieces of content generated after rendering an area including a main entity and an area including a sub-entity in different rendering schemes.

To this end, the web content output apparatus may render an area inducting a main entity on a canvas and may render an area including a sub-entity by using CSS, in which the sub-entity may be defined as a DOM node in a web document.

Sub-entities may be distinguished from each other as separate DOM nodes in a scheme, such as a <div> tag and the like. When the web content output apparatus renders an entity formed to be a separate DOM node as described above, the web content output apparatus changes the position of the entity to the CSS and moves the entity to the CSS.

The CSS determines the style of a web document, that is, sizes, fonts, colors, and the like of respective elements included in the web document. The rendering engine may complete the rendering of a sub-entity, which is defined as a DOM node, through a painting process after forming a layout by combining a CSS style structure with the sub-entity.

Also, the web content output apparatus renders an area of a main entity, which is obtained by excluding a sub-entity, on the canvas in a conventional manner. Then, the web content output apparatus may output completed web content by overlaying pieces of content generated according to separate rendering schemes.

According to the above-described present disclosure, when a web document is output through a web browser, the effect of preventing rendering performance from being reduced in some operating systems by reducing a rendering area of an HTML canvas can be achieved.

Meanwhile, implementations of the functional operations and subject matter described in this specification can be implemented by a digital electronic circuit, in computer software, firmware, or hardware that includes the structures disclosed in this specification and structural equivalents thereof, or in combinations of one or more thereof. Implementations of the subject matter described in this specification may be implemented as one or more computer program products, that is, one or more modules of computer program instructions, encoded on a tangible program storage medium in order to control an operation of, or for execution by, a processing system.

A computer-readable medium may be a machine-readable storage device, a machine-readable storage substrate, a memory device, a composition of a material affecting a machine-readable radio wave signal, or a combination of one or more thereof.

In this specification, the term "system" or "device" encompasses, for example, a programmable processor, a computer, or all kinds of mechanisms, devices, and machines that include a multiprocessor or a computer and process data. The processing system may include, in addition to hardware, a code that creates an execution environment for a computer program when requesting, for example, a code that constitutes processor firmware, a protocol stack, a database management system, an operating system, or a combination of one or more thereof.

A computer program (also known as a program, software, software application, script, or code) can be written in any form of a programming language, which includes compiled or interpreted languages, or declarative or procedural languages, and it can be deployed in any form, including a stand-alone program or module, a component, a subroutine, or another unit suitable for use in a computing environment. A computer program may, but need not, correspond to a file in a file system. A program can be stored in a single file provided to the requested program, in multiple coordinated files (e.g., files that store one or more modules, sub-programs, or portions of code), or in a portion of a file that holds other programs or data (e.g., one or more scripts stored in a markup language document). A computer program can be deployed to be executed on one computer or on multiple computers that are located at one site or distributed across multiple sites and interconnected by a communication network.

Meanwhile, examples of a computer-readable medium suitable for storing computer program instructions and data may include all forms of non-volatile memory, media, and memory devices, for example, a semiconductor memory device such as an Erasable Programmable Read-Only Memory (EPROM), an Electrically Erasable Programmable Read-Only Memory (EEPROM), and a flash memory device; a magnetic disk such as an internal hard disk or an external disk; a magneto-optical disk; and Compact Disc-Read Only Memory (CD-ROM) and Digital Versatile Disc-Read Only Memory (DVD-ROM) disks. A processor and a memory may be supplemented by, or integrated into, a special-purpose logic circuit.

Implementations of the subject matter described in this specification can be implemented in a computing system that includes a back-end component such as a data server; or that includes a middleware component such as an application server, or that includes a front-end component such as a client computer having a web browser or a graphical user interface through which a user can interact with an implementation of the subject matter described in this specification, or that includes all combinations of one or more of the back-end, middleware, and front-end components. The components of the system can be interconnected by any form or medium of digital data communication, such as a communication network.

Although this specification includes details of multiple specific implementations, the specific implementation details should not be construed as limitations on the scope of any inventions or of what may be claimed, but rather as descriptions of features specific to particular embodiments of particular inventions. Similarly, particular features that are described in this specification in the context of separate embodiments can also be implemented in combination in a single embodiment. Conversely, various features that are described in the context of a single embodiment can also be implemented in multiple embodiments separately or in any suitable sub-combination. Further, although features may be described above as acting in particular combinations and even initially claimed as such, in some cases, one or more features from a claimed combination can be excluded from the combination, and the claimed combination may be changed to a sub-combination or variation of a sub-combination.

Also, in this specification, the operations are depicted in a particular order in the drawings, but this depiction should not be understood as requiring that the operations be performed in the particular order shown or in a sequential order, or that all illustrated operations be performed, in order to achieve desirable results. In a particular case, multitasking and parallel processing may be advantageous. Further, the separation of various system components in the above-described embodiments should not be understood as requiring such separation in all embodiments, and it should be understood that the described program components and systems can generally be integrated together in a single software product or packaged into multiple software products.

As described above, the specific terms used in this specification do not limit the present disclosure. Therefore, although the present disclosure has been described in detail with reference to the above-described embodiments, those skilled in the art can apply reconstructions, changes in form, and modifications to the embodiments without departing from the scope of the present disclosure. The scope of the present disclosure is defined by the appended claims, rather than the detailed description, and should be construed as including all modifications and variations derived from the meaning and scope of the claims and concept equivalent thereto.

What is claimed is:

1. A web content output apparatus comprising:
   a memory; and
   a processor configured to execute instructions stored in the memory and to:
   identify device information;
   extract entities in a web document, where each entity represents an object in a web game;
   classify the extracted entities into at least one main entity and sub-entity, where the sub-entity has a lower importance level than the main entity and the main entity includes portions of the web document other than the sub-entity; and
   render the web document and output the rendered web document, where to render the web document and output the rendered web document, the processor is configured to:
   render an area in the web document including the main entity in such a manner as to distinguish the area in the web document from another area in the web document when the identified device information corresponds to a predetermined piece of device information.

2. The web content output apparatus as claimed in claim 1, wherein the processor is further configured to refrain from rendering the sub-entity in the web document.

3. The web content output apparatus as claimed in claim 1, wherein the processor is configured to reduce a resolution of an area in the web document including the sub-entity.

4. The web content output apparatus as claimed in claim 1, wherein the processor is configured to render the area of the web document including the main entity and an area of the web document including the sub-entity in different rendering schemes, and to then output respective pieces of content generated using the different rendering schemes in such a manner as to overlay the respective pieces of content.

5. The web content output apparatus as claimed in claim 4, wherein the web document corresponds to a web document generated according to Hypertext Markup Language 5 (Html 5), and the rendering engine is configured to render the area including the main entity on a canvas, and to render the area including the sub-entity by using Cascading Style Sheets (CSS).

6. The web content output apparatus as claimed in claim 5, wherein the sub-entity is a Document Object Model (DOM) node in the web document.

7. The web content output apparatus as claimed in claim 1, wherein the device information comprises operating system information and version information utilized by the processor of the web content output apparatus.

8. A method for outputting web content by a web content output apparatus, the method comprising:
   identifying, with a processor a web content output apparatus, device information;
   extracting, with the processor, entities in a web document, where each entity represents an object in a web game, and classifying the extracted entities into at least one main entity and sub-entity, where the sub entity has a lower importance level than the main entity and the main entity includes portions of the web document other than the sub-entity; and
   rendering, with the processor, the web document and outputting the rendered web document, wherein the rendering of the web document and the outputting of the rendered web document comprises rendering an area in the web document including the main entity in such a manner as to distinguish the area in the web document from another area in the web document when the identified device information corresponds to any predetermined one piece of device information.

9. The method as claimed in claim 8, wherein the rendering of the web document and the outputting of the rendered web document comprises refraining from rendering an area of the web document including the sub-entity.

10. The method as claimed in claim 8, wherein the rendering of the web document and the outputting of the rendered web document comprises reducing a resolution of an area including the sub-entity.

11. The method as claimed in claim 8, wherein the rendering of the web document and the outputting of the rendered web document comprises:
   rendering an area in the web document including the main entity and an area in the web document including the sub-entity in different rendering schemes; and
   outputting respective pieces of content generated by the different rendering schemes in such a manner as to overlay the respective pieces of content.

12. The method as claimed in claim 11, wherein the web document corresponds to a web document generated according to Hypertext Markup Language 5 (Html 5), and the rendering of the web document and the outputting of the rendered web document comprises rendering the area in the web document including the main entity on a canvas, and rendering the area in the web document including the sub-entity using Cascading Style Sheets (CSS).

13. The method as claimed in claim 12, wherein the sub-entity is a Document Object Model (DOM) node in the web document.

14. The method as claimed in claim 8, wherein the device information comprises operating system information and version information which are used by the processor of the web content output apparatus.

* * * * *